(12) United States Patent
Lukens (10) Patent No.: US 8,640,468 B2
(45) Date of Patent: Feb. 4, 2014

(54) ISOTHERMAL GAS SUPPLY AND METHOD FOR MINIMIZING THE TEMPERATURE EXCURSION OF A GAS MIXTURE RELEASED THEREFROM

(75) Inventor: Peter C. Lukens, Oceanside, CA (US)

(73) Assignee: Raytheon Company, Waltham, MA (US)

( * ) Notice: Subject to any disclaimer, the term of this patent is extended or adjusted under 35 U.S.C. 154(b) by 1100 days.

(21) Appl. No.: 12/467,747

(22) Filed: May 18, 2009

(65) Prior Publication Data

US 2009/0288427 A1    Nov. 26, 2009

Related U.S. Application Data

(60) Provisional application No. 61/055,082, filed on May 21, 2008.

(51) Int. Cl.
| F25B 19/02 | (2006.01) |
| F17C 5/02 | (2006.01) |
| F25B 19/00 | (2006.01) |
| F25B 9/00 | (2006.01) |

(52) U.S. Cl.
USPC ............... 62/51.2; 62/6; 62/48.1; 62/51.1; 62/600

(58) Field of Classification Search
USPC ............. 62/51.2, 46.1, 48.1, 97, 122
See application file for complete search history.

(56) References Cited

U.S. PATENT DOCUMENTS

| 5,337,572 A | 8/1994 | Longsworth |
| 5,441,658 A | 8/1995 | Boyarsky et al. |
| 5,577,387 A * | 11/1996 | Maytal ............. 62/51.2 |
| 5,956,958 A | 9/1999 | Dobak, III et al. |
| 6,074,572 A | 6/2000 | Li et al. |
| 2002/0049436 A1 | 4/2002 | Zvuloni et al. |
| 2006/0219298 A1 | 10/2006 | Suzuki |
| 2007/0125441 A1 | 6/2007 | Farese et al. |
| 2007/0246122 A1 | 10/2007 | Handa |

FOREIGN PATENT DOCUMENTS

| WO | 9311971 | 6/1993 |
| WO | 9806985 | 2/1998 |

OTHER PUBLICATIONS

Oneida Researcg Services Inc., "ORS Technical Brief: Interpretation of RGA Data", 1994.*
European Patent Office "International Search Report," mailed Aug. 3, 2009 for International Application No. PCT/US2009/044535, filed May 19, 2009.

* cited by examiner

*Primary Examiner* — Frantz Jules
*Assistant Examiner* — Keith Raymond (57) ABSTRACT

Embodiments of a pressurized gas supply are provided. In one embodiment, the pressurized gas supply includes a pressurized gas reservoir and a pressure reducer fluidly coupled to the pressurized gas reservoir. The pressure reducer is configured to reduce the pressure of gas received from the pressurized gas reservoir to a predetermined output pressure ($P_O$). A gas mixture is held within the pressurized gas reservoir at a starting pressure ($P_S$) and at a starting temperature ($T_S$). The gas mixture includes: (i) a warming gas having a positive Joule-Thomson (JT) coefficient at $T_S$ and over the pressure range $P_S$-$P_O$, and (ii) a cooling gas having a negative JT coefficient at $T_S$ and over the pressure range $P_S$-$P_O$. The cooling of the cooling gas at least partially offsets the warming of the warming gas when the gas mixture is expelled by the isothermal gas supply to achieve a desired gas output temperature.

18 Claims, 3 Drawing Sheets

ISOTHERMAL GAS SUPPLY AND METHOD FOR MINIMIZING THE TEMPERATURE EXCURSION OF A GAS MIXTURE RELEASED THEREFROM

CROSS-REFERENCES TO RELATED APPLICATIONS

This application claims the benefit of U.S. Provisional Application Ser. No. 61/055,082, filed May 21, 2008.

TECHNICAL FIELD

Embodiments of the present invention relate generally to a pressurized gas supply and, more particularly, to an isothermal gas supply and method for minimizing the temperature excursion of a gas mixture released therefrom.

BACKGROUND

Pressurized gas supplies are utilized in a variety of industries and in conjunction with a variety of gas-consuming devices, such as gas actuators and pneumatic isolators of the type employed within optical benches and magnetic resonance imaging machines. As a specific example, a pressurized gas supply may be deployed onboard a missile and utilized to adjust the position of control surfaces (e.g., the missile's fins), to open collapsible wings, or to drive one or more rotating gas bearings. When deployed onboard a missile, or utilized in other such applications wherein available space is limited, the pressurized gas supply may include a pressurized vessel (e.g., a metal tank) containing gas under extreme pressures; e.g., 4,000 pounds per square inch absolute (psia) to 9,000 psia or more. A pyrotechnic valve and a pressure regulator are fluidly coupled between the pressurized vessel and the gas-consuming device. The pyrotechnic valve normally prevents the release of pressurized gas from the pressurized vessel. To initiate operation of the pressurized gas supply, a charge within the pyrotechnic valve is ignited. This drives a pin through the wall of a gas supply tube permitting gas flow from pressurized vessel, through the valve, and to the pressure regulator. The pressure regulator then reduces the pressure of gas to a predetermined output pressure suitable for driving the gas-consuming device.

To operate certain gas-consuming devices in a reliable manner, it is desirable for a pressurized gas supply to provide gas output at a consistent mass flow rate and temperature. However, conventional pressurized gas supplies, and specifically conventional pressurized gas supplies wherein the gas output pressure is significantly less than the gas reservoir pressure, often fail to provide a consistent mass flow rate due to variations in temperature and corresponding variations in density of the output gas. Depending upon the species of gas contained within the pressurized vessel, and depending upon the operational temperature range and pressure range of the pressurized gas supply, the pressurized gas may heat or cool upon expansion across the pressure regulator (an occurrence commonly referred to as the "Joule-Thomson effect" or as the "Joule-Kelvin effect"). In addition, as gas is released from the pressurized vessel, the gas held within the pressurized vessel may continually cool due to the work done by the gas in the vessel to expel gas therefrom. Significant excursions in gas temperature may consequently occur over the operation of the pressurized gas supply resulting in undesirable fluctuations in gas density and, therefore, in mass flow rate. As a further disadvantage, if the temperature of the output gas decreases significantly, water and other contaminants entrained in the gas stream and on surfaces in contact with the gas stream may freeze, restrict gas flow, impede operation of the gas regulator or otherwise impact the performance of the gas-consuming device in an undesirable manner.

Accordingly, it is desirable to provide an isothermal gas supply for use in conjunction with certain gas-consuming devices (e.g., a gas bearing) that minimizes temperature excursion of the output gas (or gases) to maintain a substantially constant gas density and, therefore, a substantially constant mass flow rate. More generally, it is desirable to provide a pressurized gas supply that achieves a desired gas output temperature substantially equivalent to or greater than the starting temperature of the gas (or gases) held within the pressurized gas reservoir. It is also desirable to provide a method for minimizing the temperature deviation of gas or gas mixture released from a pressurized gas supply. Other desirable features and characteristics of the present invention will become apparent from the subsequent Detailed Description and the appended Claims, taken in conjunction with the accompanying Drawings and this Background.

BRIEF SUMMARY

Embodiments of a pressurized gas supply are provided. In one embodiment, the pressurized gas supply includes a pressurized gas reservoir and a pressure reducer fluidly coupled to the pressurized gas reservoir. The pressure reducer is configured to reduce the pressure of gas received from the pressurized gas reservoir to a predetermined output pressure ($P_O$). A gas mixture is held within the pressurized gas reservoir at a starting pressure ($P_S$) and at a starting temperature ($T_S$). The gas mixture includes: (i) a warming gas having a positive Joule-Thomson (JT) coefficient at $T_S$ and over the pressure range $P_S$-$P_O$, and (ii) a cooling gas having a negative JT coefficient at $T_S$ and over the pressure range $P_S$-$P_O$. The cooling of the cooling gas at least partially offsets the warming of the warming gas when the gas mixture is expelled by the isothermal gas supply to achieve a desired gas output temperature.

Methods for minimizing the temperature excursion of a gas mixture released from a pressurized gas supply are also provided. The pressurized gas supply includes a pressurized gas reservoir and a pressure regulator fluidly coupled between the pressurized gas reservoir and an outlet of the pressurized gas supply. The pressure regulator is configured to reduce the pressure of the gas mixture to a predetermined output pressure ($P_O$). In one embodiment, the method includes the steps of: (i) establishing the starting temperature of the gas mixture ($T_S$) and the starting pressure of the gas mixture ($P_S$); (ii) selecting a warming gas to be included within the gas mixture, the warming gas having a positive Joule-Thomson (JT) coefficient at $T_S$ and over the pressure range $P_S$-$P_O$; (iii) choosing a cooling gas to be included within the gas mixture, the cooling having a negative JT coefficient at $T_S$ and over the pressure range $P_S$-$P_O$; and (iv) filling the pressurized gas supply with a gas mixture.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
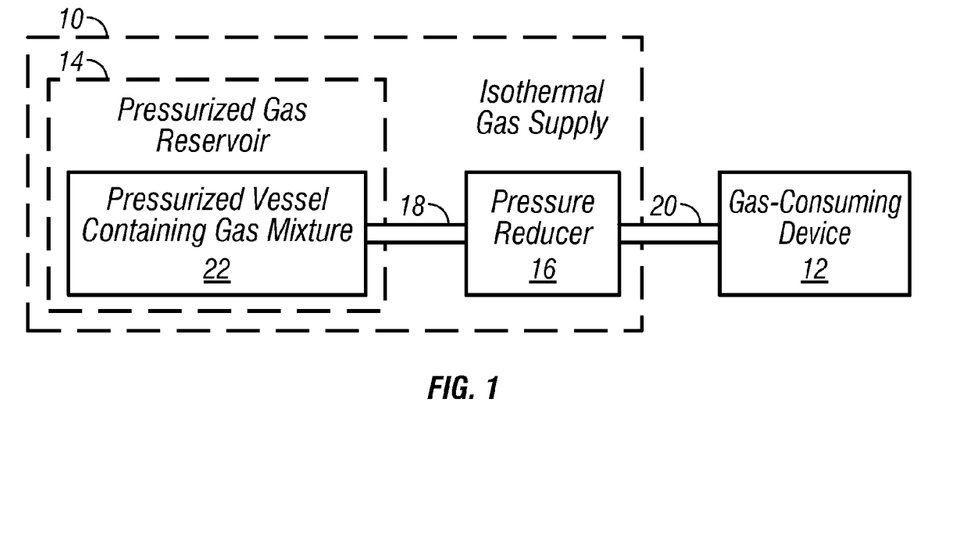
FIG. 1 is a generalized schematic of an isothermal gas supply and a gas-consuming device in accordance with a first exemplary embodiment.

FIG. 1 is a generalized schematic of an isothermal gas supply 10 and a gas-consuming device 12 in accordance with a first exemplary embodiment. Isothermal gas supply 10 includes a pressurized gas reservoir 14 and a pressure reducer 16. An outlet of pressurized gas reservoir 14 is fluidly coupled to an inlet of pressure reducer 16 by a first flow passage 18, and an outlet of pressure reducer 16 is fluidly coupled to the inlet of gas-consuming device 12 by a second flow passage 20. Pressure reducer 16 may comprise any device or structural element, active or passive (e.g., an orifice), suitable for reducing the pressure of the gas received from pressurized gas reservoir 14 to a predetermined output pressure ($P_O$) at a predetermined flow rate ($F_O$), suitable for driving gas-consuming device 12 as described more fully below. In a preferred group of embodiments, pressure reducer 16 comprises a pressure regulator. Gas-consuming device 12 may likewise comprise any mechanism that consumes or exhausts pressurized gas during use. For example, gas-consuming device 12 may comprise a gas actuator (e.g., a translatable piston) or a pneumatic isolator utilized to stabilize an optical bench or the magnet of a magnetic resonance imaging machine. These examples notwithstanding, gas-consuming device 12 and isothermal gas supply 10 are preferably deployed onboard a missile. In this case, gas-consuming device 12 may assume the form of a gas bearing utilized to facilitate the rotational movement of a mirror as described more fully below in conjunction with FIG. 2.

In the exemplary embodiment illustrated in FIG. 1, pressurized gas reservoir 14 includes a single pressurized vessel 22, which holds a gas mixture at a predetermined starting pressure ($P_S$) and a predetermined starting temperature ($T_S$). During operation of isothermal gas supply 10, the pressurized gas mixture flows from pressurized gas reservoir 14 to pressure reducer 16, which expands the gas mixture in a controlled manner to reduce the pressure of the gas mixture to the predetermined output pressure and flow rate ($P_O$, $F_O$). $P_S$ and $T_S$ will inevitably vary amongst different embodiments; however, it will be noted that $P_S$ will be significantly greater than $P_O$, except in embodiments wherein pressurized gas reservoir 14 is finite and nears exhaustion. In embodiments wherein gas reservoir 14 is finite and the pressure within gas reservoir 14 is unregulated, $P_S$ will decrease within pressurized gas reservoir 14 from a maximum starting pressure ($P_{Smax}$) to a minimum starting pressure ($P_{Smin}$) as the gas mixture is released from gas reservoir 14 during operation of isothermal gas supply 10. The minimum starting pressure ($P_{Smin}$) represents the lowest pressure that occurs within pressurized gas reservoir 14 during the operational lifespan of isothermal gas supply 10, which may be determined by a shut-off threshold of pressure reducer 16. In actual embodiments of isothermal gas supply 10, the minimum starting pressure $P_{Smin}$ will typically exceed the output pressure of gas supply 10 ($P_O$) and will consequently be subsumed in the operational pressure range $P_{Smax}$-$P_O$. As a non-limiting example, and as discussed more fully below, $P_{Smax}$, $P_{Smin}$, and $P_O$ may be approximately 4,000 psia, 500 psia, and 40 psia, respectively. In many embodiments, $T_S$ will be substantially equivalent to ambient temperature (e.g., 300 Kelvin).

As a point of emphasis, the gas mixture releasably held within pressurized vessel 22 includes at least two gases: (i) a first gas having a positive Joule-Thomson (JT) coefficient at $T_S$ and over the pressure range $P_S$-$P_O$, and (ii) a second gas having a negative JT coefficient at $T_S$ and over the pressure range $P_S$-$P_O$. Gases having a positive JT coefficient heats during expansion through pressure reducer 16; for this reason, such gases referred herein to as "warming gases." Conversely, gases having a negative JT coefficient cool during expansion through pressure reducer 16; consequently, such gases are referred herein to as "cooling gases." The JT coefficient for a particular gas is defined below:

$$\mu_{JT} = \left(\frac{\partial T}{\partial P}\right)_H \qquad \text{EQ. 1}$$

where $\mu_{JT}$ is the Joule-Thomson coefficient, T is gas temperature, P is gas pressure, and H denotes constant enthalpy.

As the gas mixture is expanded through pressure reducer 16 during operation of isothermal gas supply 10, the cooling of cooling gas substantially offsets the warming of the warming gas. As a result, isothermal gas supply 10 releases the gas mixture at a predetermined gas output temperature ($T_O$), which deviates from the initial temperature of the gas mixture within pressurized vessel 22 (referred to herein as the "gas mixture starting temperature" or "$T_S$") significantly less than conventional pressurized gas supplies. In certain embodiments, the gas species and the mass ratio of the gas species included within the gas mixture are selected such that the gas mixture output temperature ($T_O$) differs from the gas mixture starting temperature ($T_S$) by no more than 10%. In a preferred group of embodiments, the mass ratio of the gas species included within the gas mixture are selected such that the temperature of the gas mixture released from isothermal gas supply 10 is substantially equivalent to the gas mixture starting temperature ($T_O \approx T_S$). By maintaining the temperature of the released gas mixture at or near the predetermined output temperature ($T_O$), the density, and therefore the mass flow rate, of the gas mixture supplied to gas-consuming device 12 may be held substantially constant. A more specific example of an isothermal gas supply and of the various combinations of gases that may be included in the gas mixture is described below in conjunction with FIGS. 2-4.

Figure 2:
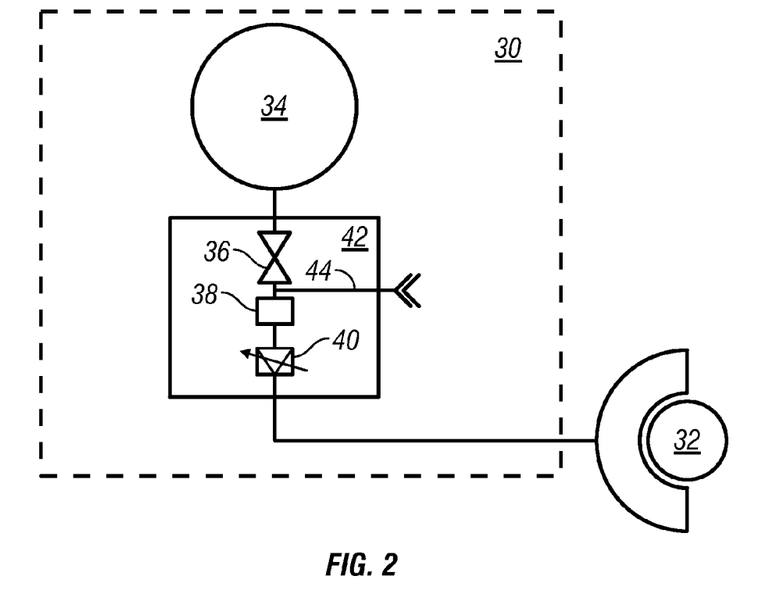
FIG. 2 is a schematic of a specialized isothermal gas supply and a gas bearing suitable for deployment onboard a missile in accordance with a second exemplary embodiment.

FIG. 2 is a schematic of a specialized isothermal gas supply 30 and a gas bearing 32 suitable for deployment onboard a missile in accordance with a second exemplary embodiment. In this particular example, isothermal gas supply 30 includes a pressurized vessel 34 (e.g., a metal tank), a pyrotechnic valve 36, a particle filter 38, and a pressure regulator 40. As indicated generically in FIG. 2, pyrotechnic valve 36, particular filter 38, and pressure regulator 40 may each be disposed within a housing assembly 42 in flow series. Gas bearing 32 is fluidly coupled to the outlet of pressure regulator 40 via an outlet line 44. As previously indicated, pressurized vessel 34 contains a gas mixture at a predetermined starting pressure ($P_S$) and temperature ($T_S$). Pyrotechnic valve 36 normally resides in a closed position and prevents the release of the gas mixture from pressurized vessel 34.

To initiate operation of isothermal gas supply 30, a controller (not shown) detonates a charge within pyrotechnic valve 36 to actuate valve 36 to an open position. Upon actuation of pyrotechnic valve 36, the pressurized gas mixture flows from pressurized vessel 34, through pyrotechnic valve 36, through particle filter 38, and into pressure regulator 40. Particle filter 38 prevents any large particles produced by actuation of pyrotechnic valve 36 from flowing into regulator 40 and interfering with the operation thereof. As indicated above, pressure regulator 40 reduces the pressure of the gas mixture to a predetermined output pressure and flow rate ($P_O$, $F_O$) suitable for driving gas bearing 32. From pressure regulator 40, the gas mixture flows through output line 44 and into gas bearing 32. Gas bearing 32 then expels the pressurized gas mixture from a plurality of bearing orifices to create a thin gaseous film, which facilitates the rotation of the rotating component of bearing 32. Due to the nature of pyrotechnic valve 36, valve 36 generally cannot be tested to ensure its functionality, or the functionality of components downstream of valve 36, prior to actual use. Therefore, to permit the testing of components downstream of valve 36, and specifically to permit the testing of pressure regulator 40, a test port may be provided through housing 42 at a location upstream of particle filter 38 as generally shown in FIG. 2 at 46.

As isothermal gas supply 30 is designed for deployment onboard a missile, the weight and envelope of pressurized vessel 34 are minimized. To compensate for the reduced capacity of pressurized vessel 34, the gas mixture is held within vessel 34 under a considerable starting pressure ($P_S$). As noted above, pressure regulator 40 decreases the pressure of the gas mixture received from vessel 34 to the predetermined output pressure ($P_O$), which may be significantly less than $P_S$. Furthermore, during the release of gas from pressurized vessel 34, the pressure of the gas mixture within vessel 34 will decrease from an initial maximum starting pressure ($P_{Smax}$) to a minimum staring pressure ($P_{Smin}$). For the purposes of illustration, the following discussion will assume $P_{Smax}$, $P_{Smin}$, and $P_O$ to be substantially equivalent to 4,000 psia, to 500 psia, and to 40 psia (ambient), respectively. As indicated above, the minimum starting pressure $P_{Smin}$ will typically exceed the output pressure of gas supply 30 ($P_O$) and consequently will be subsumed in the operational pressure range $P_{Smax}$-$P_O$. The following discussion will also assume the starting temperature ($T_S$) of the gas mixture held within pressurized vessel to be substantially equivalent to ambient (300 Kelvin).

As previously stated, gases having a negative JT coefficient at $T_S$ and over the pressure range $P_S$-$P_O$ cool upon expansion through pressure regulator 40. In addition to any cooling that occurs due to the Joule-Thomson effect, a second cooling effect also occurs within pressurized vessel 34 as a result of the work done by the gas contained in vessel 34 to expel the gas mixture from vessel 34. This may be more fully appreciated by referring to Equations 2-10 below. The temperature decrease of the gas mixture within pressurized vessel 34 may be derived from the first law of thermodynamics:

$$dU=dQ-dW \qquad \text{EQ. 2}$$

where U represents internal energy, Q represents heat flow into or out of the reservoir gas, W represents work performed by the gas within pressurized vessel 34.

In embodiments wherein pressurized vessel 34 is thermally isolated, heat flow into or out of pressurized vessel 34 is substantially zero (Q=0). Therefore, Equation 2 becomes:

$$dU=-dW \qquad \text{EQ. 3}$$

The work performed by the gas mixture within pressurized vessel 34 is:

$$dW=PdV \qquad \text{EQ. 4}$$

where P is the pressure of the gas mixture within pressurized vessel 34 (at least initially equal to $P_S$), and dV is the change in volume due to gas flow from pressurized vessel 34.

Considering pressure regulator 40 to be ideal (i.e., considering the volumetric flow through pressure regulator 40 to be constant with time), the power expended by the gas mixture within pressurized vessel 34 may be calculated via Equation 5 below:

$$\text{Power}=dW/dt=P_O(dV/dt) \qquad \text{EQ. 5}$$

The power expended by the gas mixture held within pressurized vessel 22 results in a decrease in the internal energy of the gas mixture, which manifests as a temperature drop:

$$dU=(m_1c_1+m_2c_2)dT \qquad \text{EQ. 6}$$

where $m_1$ and $c_1$ are the mass and heat capacity, respectively, of the first gas species held within pressurized vessel 22 (e.g., the warming gas); $m_2$ and $c_2$ are the mass and heat capacity, respectively, of the second gas species held within vessel 22 (e.g., the cooling gas); and dT is the change in temperature of gas mixture within vessel 22.

Equation 6 can also be written in time-dependent form:

$$dU/dt=(m_1c_1+m_2c_2)(dT/dt) \qquad \text{EQ. 7}$$

Equations 3, 5, and 7 collectively yield the time dependence of the temperature of the gas mixture held within the pressurized vessel 22, as expressed by Equation 8 below:

$$dT/dt=-(Po/(m_1c_1+m_2c_2))(dV/dt) \qquad \text{EQ. 8}$$

In the foregoing discussion of Equations 2-8, pressurized vessel 34 was considered to be thermally isolated; that is, dQ was considered to be zero in Equation 2. However, in actual embodiments of isothermal gas supply 30, pressurized vessel 34 may not be thermally isolated (dQ≠0). In such embodiments, the material (e.g., stainless steel) and the thickness of the walls of pressurized vessel 34 are preferably chosen such that vessel 34 transfers heat (Q) to the gas mixture at a rate sufficient to generally offset the rate at which the gas mixture cools within vessel 34. This concept is expressed by Equation 9 below:

$$dQ=dW \qquad \text{EQ. 9}$$

In view of Equation 9, Equation 1 reduces to:

$$dU=0 \qquad \text{EQ. 10}$$

Considering Equations 9 and 10 in conjunction with Equations 2-8, it should be appreciated that the temperature of the gas mixture received by pressure regulator 40 will be substantially equivalent to ambient temperature (300 Kelvin). As explained below in conjunction with FIG. 3, the mass ratio of the cooling gas relative to the warming gas is selected such that the warming of the warming gas at least partially offsets the cooling of the cooling gas to maintain the temperature of the gas mixture expelled from pressure regulator 40, and more generally the temperature of the gas mixture released from isothermal gas supply 30, at or near the predetermined output temperature ($T_O$). As indicated above, and as explained more fully below, the mass ratio of the cooling gas relative to the warming gas is preferably selected such that the temperature excursion of the gas mixture is minimized and the gas mixture starting temperature ($T_S$) is substantially equivalent to the gas mixture output temperature ($T_O$); e.g., in keeping with the example introduced above, $T_S \approx T_O \approx 300$ Kelvin.

Figure 3:
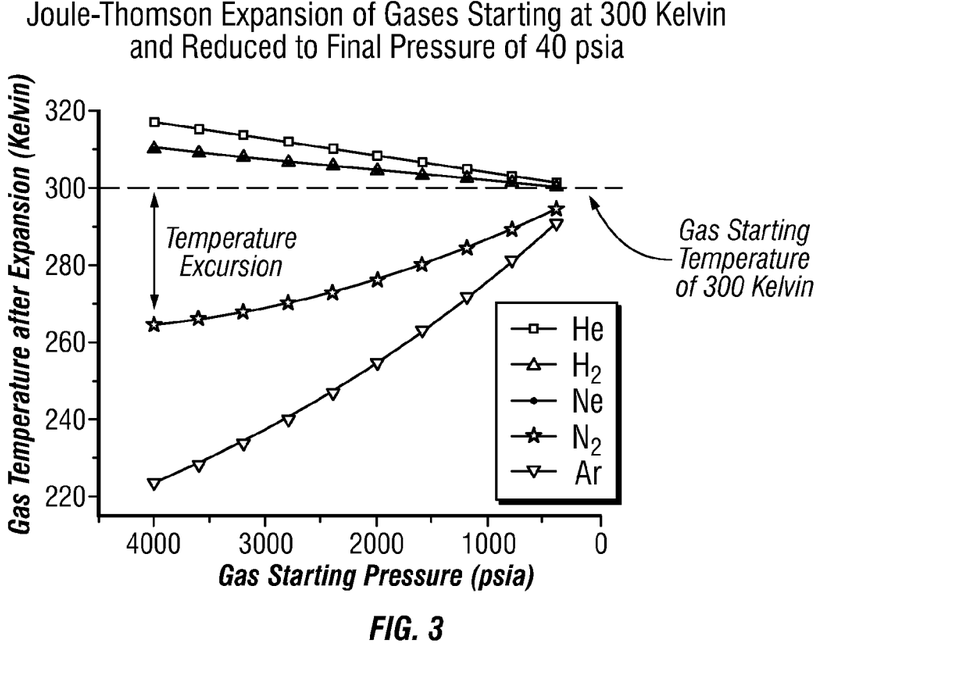
FIG. 3 is a first graph illustrating temperature excursion (vertical axis) as a result of the Joule-Thomson expansion of five exemplary gases starting at an initial temperature of 300 Kelvin and reduced from an exemplary range of starting pressures (horizontal axis) to a final pressure of 40 psia.

FIG. 3 is a graph illustrating the temperature excursion (vertical axis) for a selected group of five gases initially starting at a temperature of 300 Kelvin ($T_s$) and over a range of starting pressures (horizontal axis) corresponding to the exemplary maximum and minimum operating pressures of pressurized vessel 34 ($P_{Smax}$-$P_{Smin}$; 4,000-500 psia). The fives gases identified in FIG. 3 are helium, hydrogen, neon, nitrogen, and argon. Helium, hydrogen, and neon each have a positive JT coefficient (temperature increases when expanded) at the exemplary starting temperature of 300 Kelvin and over the operational pressure range ($P_S$-$P_O$) of isothermal gas supply 30 (FIG. 2); thus, helium, hydrogen, and neon are considered "warming gases" in the present context. Conversely, nitrogen and argon have a negative JT coefficient (temperature decreases when expanded) at the exemplary starting temperature 300 Kelvin and the over the pressure range $P_S$-$P_O$ and thus are considered "cooling gases" in the present context. To avoid confusion, it is emphasized that FIG. 3 is not a time dependent enthalpy curve illustrating the JT coefficients of helium, hydrogen, neon, nitrogen, and argon, but is instead a graph illustrating the temperature excursion of these gases beginning at 300 Kelvin after expansion to 40 psia.

The fives gases identified in FIG. 3 and described herein are offered as a non-exhaustive list of examples only; the gas mixture contained within pressurized vessel 34 may include numerous other gases satisfying the criteria described herein. The particular gases selected as the heating and cooling gases will depend on many factors including the magnitude and sign of the JT effect at the starting temperature ($T_S$) and over the operative pressure range ($P_s$-$P_o$) and the chemical characteristics of the gases (e.g., flammability, chemical inertness, toxicity, molecular weight, etc.). This notwithstanding, the heating gas is preferably selected from the three gases identified in FIG. 3, namely, helium, hydrogen, and neon; and the cooling gas is preferably selected from the two gases identified in FIG. 3, namely, nitrogen and argon. In a more preferred embodiment, helium is selected as the warming gas. Helium is generally preferred due to its non-flammability and inert nature. In the context of the present example, helium has a relatively large JT effect near 300 Kelvin and over the exemplary pressure range ($P_S$-$P_O$). In addition, leak detectors are readily available that are tuned to helium; thus, by including helium in the gas mixture, any leakages from pressurized vessel 34 can be detected with relative ease.

Figure 4:
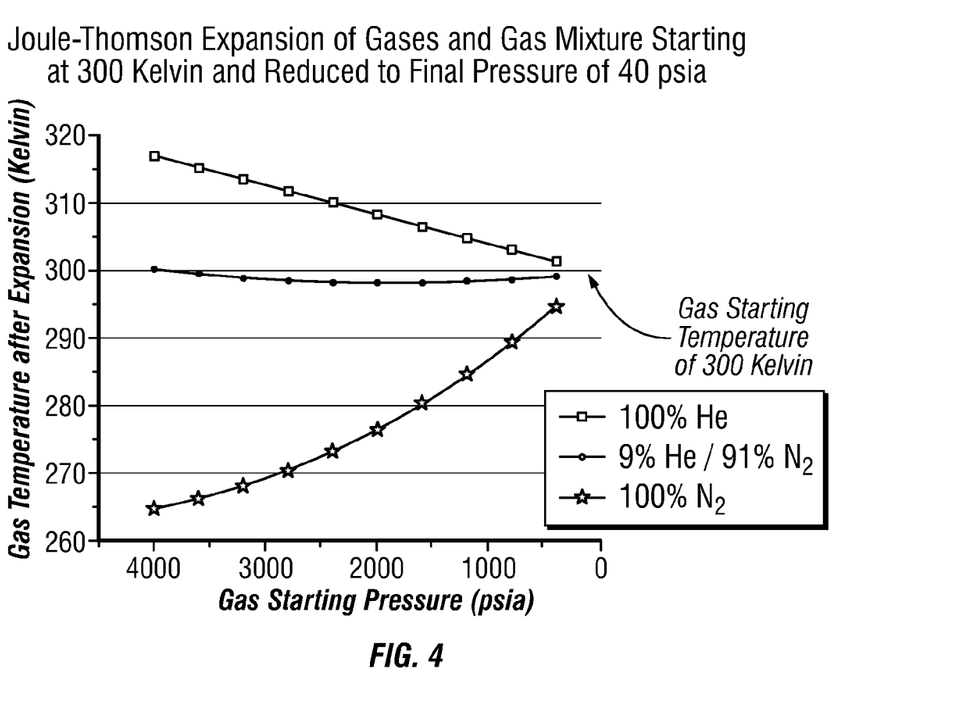
FIG. 4 is a second graph illustrating temperature excursion (vertical axis) as a result of the Joule-Thomson expansion of two exemplary gases and one exemplary gas mixture starting at an initial temperature of 300 Kelvin and reduced from an exemplary range of starting pressures (horizontal axis) to a final pressure of 40 psia.

As previously noted, the mass ratio of the cooling gas relative to the warming gas is preferably selected such that the warming of the warming gas substantially offsets the cooling of the cooling gas to minimize the temperature excursion of the gas mixture of isothermal gas supply 30 ($T_O \approx T_S$). In a preferred embodiment, the gas mixture includes helium and nitrogen mixed in a predetermined mass ratio. FIG. 4 is a graph illustrating the temperature excursion (vertical axis) for a two exemplary gases and an exemplary gas mixture initially starting at a temperature of 300 Kelvin ($T_s$) and over a range of starting pressures (horizontal axis) corresponding to the exemplary maximum and minimum starting pressures of pressurized vessel 34 ($P_{Smax}$-$P_{Smin}$; 4,000-500 psia). In this example, the two exemplary gases are 100% helium and 100% nitrogen and the exemplary gas mixture is a mixture of 9% helium and 91% nitrogen, by mass. As can be seen in FIG. 4, the predetermined gas mixture of helium and nitrogen exhibits only slight temperature variation (in particular, a maximum temperature variation of approximately 1.72 Kelvin near 2,000 psia) as the pressure of the gas mixture is reduced from the exemplary range of starting pressures ($P_{Smax}$-$P_{Smin}$; 4,000-500 psia) to the output pressure ($P_O$=40 psia). Therefore, as the gas mixture is expanded through pressure regulator 40, the temperature excursion of the gas mixture is minimized. Stated differently, the output pressure of isothermal gas supply 30 ($P_O$, 300 Kelvin) is substantially equivalent to the starting temperature of the gas mixture held within pressurized vessel 34 ($P_S$, 300 Kelvin). As a result, the density and mass flow rate of the gas mixture supplied to gas bearing 32 is held substantially constant during operation of isothermal gas supply 30.

The foregoing discussion concerned an exemplary embodiment wherein the internal energy of the gas mixture within pressurized vessel 34 was substantially constant over time (as indicated by Equation 10, dU=0). Thus, in the above-described exemplary embodiment, the temperature of the gas mixture received by pressure regulator 40 was substantially equivalent to the starting temperature ($T_S$, 300 Kelvin). In embodiments wherein the thermal transfer of heat from pressurized vessel 34 to the gas mixture contained within vessel 34 is insufficient to offset the cooling of the gas mixture within vessel 34, the internal energy, and therefore the temperature, of the gas mixture within pressurized vessel 34 may decrease over time. In this exemplary case, Equation 8 may be replaced by Equation 11 below.

$$dT_1/dt = (dQ/dt) - (P_1/(m_2 c_1 + m_2 c_2))(dV/dt) \quad \text{EQ. 11}$$

wherein 0<dQ<dW.

In such cases, the mass fraction of the heating gas (or gases) is preferably increased relative to the mass fraction of the cooling gas to at least partially offset any cooling that may occur within pressurized vessel 34; e.g., with reference to the exemplary gas mixture of helium and nitrogen, the mass fraction of helium may be increased above 9%. By increasing the mass fraction of the heating gas, the temperature of the gas mixture expelled from pressure regulator 40 will be greater than the temperature of the gas mixture received by pressure regulator 40. In a preferred group of embodiments, the mass fraction of the heating gas is increased such that the temperature differential through pressure regulator 40 compensates for the cooling of the gas mixture within pressurized vessel 22 in or near its entirety. In this manner, the temperature of the gas mixture output temperature ($T_O$) is still held to be substantially equivalent to the gas mixture starting temperature ($T_S$) despite the cooling of the gas mixture within pressurized vessel 22 during the release of the gas mixture from vessel 22. Again, by minimizing the temperature of the gas mixture in this manner, the density, and therefore the mass flow rate, of the gas mixture can be maintained at a substantially constant level to help ensure the optimal operation of gas bearing 32.

In the above-described exemplary embodiment, the output temperature ($T_O$) of the gas mixture released from the isothermal gas supply was substantially equivalent to the starting temperature ($T_S$) of the gas mixture held within the pressurized gas reservoir (e.g., pressurized vessel 34 shown in FIG. 2). In alternative embodiments, the isothermal gas supply may be configured such that the gas mixture output temperature ($T_O$) differs from the gas mixture starting temperature ($T_S$) by no more than 10%. Notably, in embodiments wherein the starting temperature ($T_S$) is substantially equivalent to ambient (300 Kelvin), and the gas mixture output temperature ($T_O$) differs from the gas mixture starting temperature ($T_S$) by no more than 10%, the gas mixture output temperature ($T_O$) does not decrease below freezing temperatures (e.g., approximately 273 Kelvin at 14.7 psia). As a result, water and other contaminants entrained in the gas stream are precluded from freezing and interfering with operation of the gas regulator or impeding gas flow through the isothermal gas supply. Even in certain embodiments wherein the gas mixture output temperature ($T_O$) may differ from the gas mixture starting temperature ($T_S$) by more than 10%, it is generally preferred that the gas species and the mass ratio of the gas species included within the gas mixture are selected such that the gas mixture output temperature ($T_O$) exceeds both the dew point and the freezing point of water vapor in the gas stream. By preventing the gas mixture output temperature $T_O$ from decreasing to temperatures sufficient to freeze water and other contaminants (e.g., oil and solvent vapor) within the gas stream, the tolerance of isothermal gas supply 30 to residual contaminants is significantly increased. This increase in contaminant tolerance permits isothermal gas supply 30 to be manufactured with less costly and less time consuming cleansing steps often utilized in the production of conventional gas supplies deployed aboard missiles.

In each of the above-described exemplary embodiments, the pressurized gas reservoir included a single pressurized vessel containing both the cooling gas and the heating gas; i.e., vessel 22 shown in FIG. 1, and vessel 34 shown in FIG. 2. In alternative embodiments, the pressurized gas reservoir may include multiple pressurized vessels, each containing any combination of one or more heating and cooling gases. As appearing herein, the term "gas mixture" encompasses at least two gases that are intended to be mixed prior to or upon release from the isothermal gas supply, whether or not the gases are premixed within the pressurized gas reservoir. Thus, in embodiments wherein a first pressurized vessel contains at least one heating gas but no cooling gases, and a second cooling vessel contains at least one cooling gas but no heating gases, the pressurized gas reservoir still releasably holds a "gas mixture" as this term is defined herein.

Figure 5:
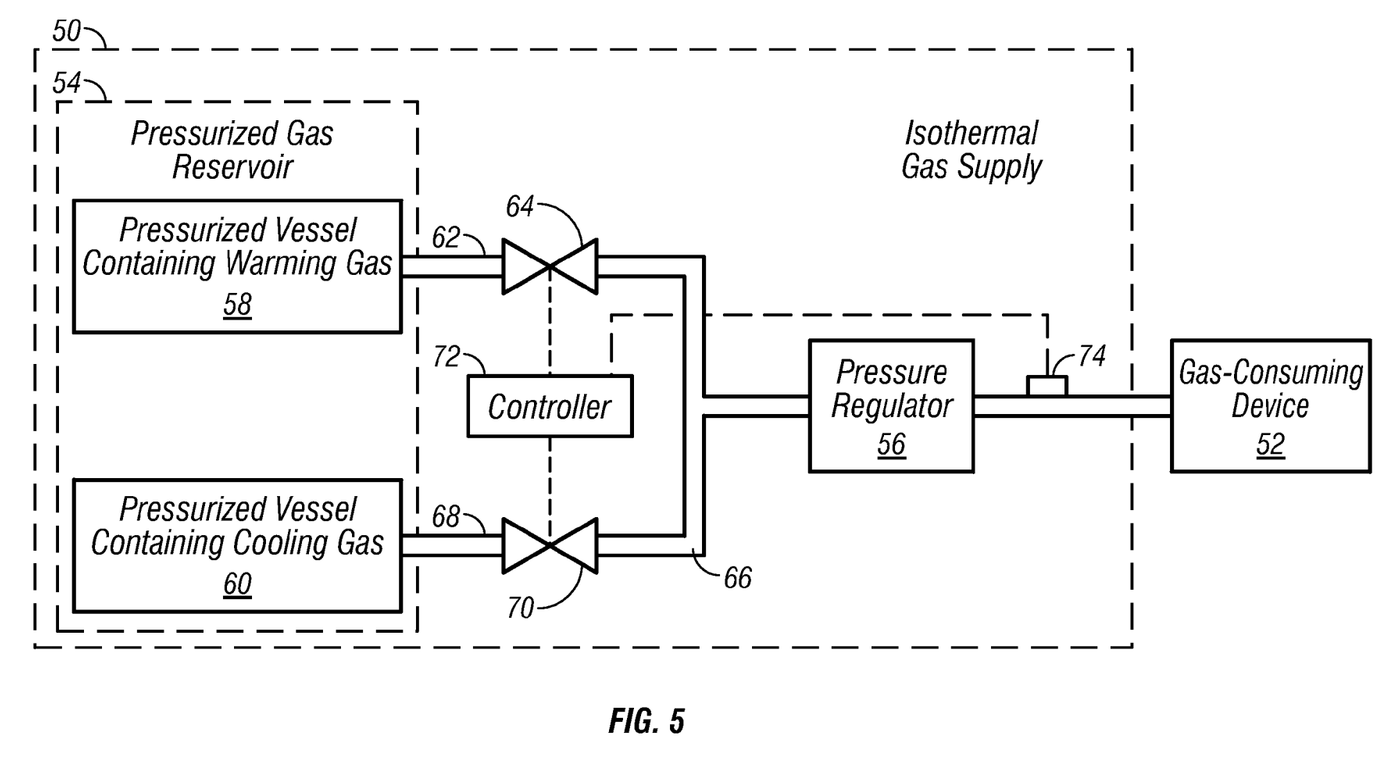
FIG. 5 is a generalized schematic of an isothermal gas supply and a gas-consuming device in accordance with a third exemplary embodiment.

In certain embodiments, the mass ratio of the gas mixture may be dynamically varied over the operation of the isothermal gas supply by varying the quantity of the warming gas released from a first pressurized vessel relative to the quantity of the cooling gas released from a second pressurized vessel. Further emphasizing this point, FIG. 5 is a generalized schematic of an isothermal gas supply 50 and a gas-consuming device 52 in accordance with a third exemplary embodiment. In many respects, isothermal gas supply 50 is similar to isothermal gas supply 10 described above in conjunction with FIG. 1. For example, isothermal gas supply 50 includes a pressurized gas reservoir 54, which releasably holds a gas mixture, and a pressure regulator 56, which is fluidly coupled between pressurized gas reservoir 54 and gas-consuming device 52 (e.g., a gas bearing). However, in contrast to the pressurized gas reservoir of isothermal gas supply 50, pressurized gas reservoir 54 includes a first pressurized vessel 58 containing at least one warming gas and a second pressurized vessel 60 containing at least one cooling gas. A first flow passage 62 fluidly couples first pressurized vessel 58 to a first flow control valve 64, and a second flow passage 68 fluidly couples second pressurized vessel 60 to a second flow control valve 70. Flow control valves 64 and 70 are each fluidly coupled to pressure regulator 56 via a third bifurcated flow passage 66.

As generically indicated in FIG. 5, a controller 72 is operatively coupled to flow control valve 64 and to flow control valve 70. During operation of isothermal gas supply 50, controller 72 adjusts the positions of flow control valves 64 and 70 to control the rate at which the warming gas escapes from pressurized vessel 58 and the cooling gas escapes from pressurized vessel 60, respectively. Thus, over the operation of isothermal gas supply 50, controller 72 may continually increase the mass fraction of the warming gas relative to the mass fraction of the cooling gas to offset any cooling that may occur within gas reservoir 54 due to the work required to expel gas from vessels 58 and 60. Controller 72 may increase the mass fraction of the warming gas by manipulating valve 64 to increase the quantity of warming gas released from pressurized vessel 58, by manipulating valve 70 to decrease the quantity of cooling gas released from pressurized vessel 60, or by utilizing a combination of these two approaches. Controller 72 may adjust the mass ratio of the heating and cooling gases released from pressurized gas reservoir 54 in accordance with a predetermined flow schedule. Alternatively, controller 72 may adjust the mass ratio of the heating and cooling gases released from pressurized gas reservoir 54 in accordance with data provided by one or more sensors. For example, and as indicated in FIG. 5, controller 72 may adjust the mass ratio of the heating and cooling gases released from pressurized gas reservoir 54 in accordance with signals received from a temperature sensor 74, which monitors the temperature of the gas mixture downstream of pressure regulator 56.

Considering the above, there has been provided multiple exemplary embodiments of a pressurized gas supply that achieves a desired gas output temperature substantially equivalent to or greater than the starting temperature of a gas mixture held within a pressurized gas reservoir. In a preferred group of embodiments, the pressurized gas supply assumes the form of an isothermal gas supply for use in conjunction with a gas-consuming device (e.g., a gas bearing) that minimizes temperature excursion of the released gas mixture to maintain a substantially constant gas density and, therefore, a substantially constant mass flow rate.

The foregoing exemplary embodiments may also be described in terms of a method for minimizing the temperature excursion of a gas mixture released from a pressurized gas supply including a pressurized gas reservoir and a pressure regulator fluidly coupled between the pressurized gas reservoir and an outlet of the pressurized gas supply. The pressure regulator is configured to reduce the pressure of the gas mixture to a predetermined output pressure ($P_O$). In one group of embodiments, the method includes the steps of: (i) establishing the starting temperature of the gas mixture ($T_S$) and the starting pressure of the gas mixture ($P_S$); (ii) selecting a warming gas to be included within the gas mixture, the warming gas having a positive Joule-Thomson (JT) coefficient at $T_S$ and over the pressure range $P_S$-$P_O$; (iii) choosing a cooling gas to be included within the gas mixture, the cooling having a negative JT coefficient at $T_S$ and over the pressure range $P_S$-$P_O$; and (iv) filling the pressurized gas reservoir with a gas mixture. The term "filling," as appearing herein, denotes only that the gas mixture is introduced into the pressurized gas reservoir and does not indicate that the reservoir is filled to its maximum capacity with the gas mixture. The method may further include the step of determining a warming gas-to-cooling gas mass ratio at which the warming of the warming gas, when expanded through the pressure regulator, substantially offsets the cooling of the cooling gas, when expanded through the pressure regulator. Alternatively, the method may include the step of determining a warming gas-to-cooling gas mass ratio at which the warming of the warming gas, when expanded through the pressure regulator, substantially offsets the combined cooling of the cooling gas, when expanded through the pressure regulator, and cooling of the pressurized gas reservoir. The warming gas is then mixed with the cooling gas at approximately the determined warming gas-to-cooling gas mass ratio. As indicated above, the method may further include the steps of selecting the warming gas from the group consisting of neon, nitrogen, and argon; and choosing the cooling gas from the group consisting of helium and hydrogen.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A pressurized gas supply, comprising:
    a pressurized gas reservoir;
    a pressure reducer fluidly coupled to the pressurized gas reservoir, the pressure reducer configured to reduce a pressure of gas received from the pressurized gas reservoir to a predetermined output pressure ($P_O$) at a predetermined mass flow rate ($F_O$); and
    a gas mixture releasably held within the pressurized gas reservoir at a starting pressure ($P_S$) and at a starting temperature ($T_S$), the gas mixture comprising:
        a warming gas having a positive Joule-Thomson (JT) coefficient at $T_S$ and over a pressure range $P_S$ to $P_O$; and
        a cooling gas having a negative JT coefficient at $T_S$ and over the pressure range $P_S$ to $P_O$, wherein cooling of the cooling gas at least partially offsets warming of the warming gas when the gas mixture is released by the pressurized gas supply to achieve a predetermined gas output temperature ($T_O$);
    wherein the gas received from the pressurized gas reservoir by the pressure reducer is output from the pressure reducer as the gas mixture output from the pressurized gas supply at $P_O$ and at $T_O$, wherein $T_O$ is substantially equivalent to $T_S$,
    wherein the gas mixture output from the pressurized gas supply is held at a substantially constant mass flow rate during operation of the pressurized gas supply, and
    wherein an outlet of the pressured gas reservoir is configured to fluidly couple to an inlet of the pressure regulator by a first flow passage, and an outlet of the pressure regulator is fluidly coupled to an inlet of a gas-consuming device by a second flow passage.

2. The pressurized gas supply according to claim 1, wherein $T_O$ is substantially equivalent to or greater than $T_S$.

3. The pressurized gas supply according to claim 1, wherein $T_O$ differs from $T_S$ by no more than 10%.

4. The pressurized gas supply according to claim 1, wherein $T_O$ exceeds a dew point and a freezing point of water vapor in the gas mixture.

5. The pressurized gas supply according to claim 1, wherein the pressurized gas reservoir is configured to cool as the gas mixture is released therefrom, and wherein a mass ratio of the cooling gas relative to the warming gas is such that the gas mixture warms as the gas mixture is expanded through the pressure reducer to substantially offset the cooling of the pressurized gas reservoir.

6. The pressurized gas supply according to claim 1, wherein the warming gas is selected from the group consisting of helium, hydrogen, and neon; and
    wherein the cooling gas is selected from the group consisting of nitrogen and argon.

7. The pressurized gas supply according to claim 1, wherein the warming gas and the cooling gas comprise helium and nitrogen, respectively.

8. The pressurized gas supply according to claim 1, wherein the pressurized gas reservoir comprises a pressurized vessel containing the warming gas and the cooling gas.

9. The pressurized gas supply according to claim 1, wherein the pressurized gas reservoir comprises:
    a first pressurized vessel containing the warming gas; and
    a second pressurized vessel containing the cooling gas.

10. The pressurized gas supply according to claim 9, wherein the pressurized gas reservoir is configured to cool as the gas mixture is released therefrom, and wherein the pressurized gas supply further comprises:
    a first valve fluidly coupled between the first pressurized vessel and an output of the pressurized gas supply;
    a second valve fluidly coupled between the second pressurized vessel and an output of the pressurized gas supply; and
    a controller operatively coupled to the first valve and to the second valve, the controller configured to adjust a position of at least one of the first valve and the second valve such that a mass quantity of the warming gas released from the first pressurized vessel increases over time relative to a mass quantity of the cooling gas released from the second pressurized vessel to substantially offset the cooling of the pressurized gas reservoir.

11. An isothermal gas supply, comprising:
    a pressurized gas reservoir;
    a pressure regulator fluidly coupled to the pressurized gas reservoir, the pressure regulator configured to reduce a pressure of gas received from the pressurized gas reservoir to a predetermined output pressure ($P_O$) at a predetermined mass flow rate ($F_O$); and
    a gas mixture releasably held within the pressurized gas reservoir at a starting pressure ($P_S$) and at a starting temperature ($T_S$), the gas mixture comprising:
        a warming gas having a positive Joule-Thomson (JT) coefficient at $T_S$ and over a pressure range $P_S$ to $P_O$;
        a cooling gas having a negative JT coefficient at $T_S$ and over the pressure range $P_S$ to $P_O$, wherein cooling of the cooling gas substantially offsets warming of the warming gas when the gas mixture is released by the isothermal gas supply to achieve a gas output temperature ($T_O$) substantially equivalent to $T_S$;
    wherein the gas received from the pressurized gas reservoir by the pressure regulator is output from the pressure regulator as the gas mixture output from the isothermal gas supply at $P_O$ and at $T_O$,
    wherein the gas mixture output from the isothermal gas supply is held at a substantially constant mass flow rate during operation of the isothermal gas supply, and
    wherein an outlet of the pressured gas reservoir is configured to fluidly couple to an inlet of the pressure regulator by a first flow passage, and an outlet of the pressure regulator is fluidly coupled to an inlet of a gas-consuming device by a second flow passage.

12. The isothermal gas supply according to claim 11, wherein at least one of:
    the warming gas and the cooling gas comprise helium and nitrogen, respectively, and the gas mixture comprises majority nitrogen as determined by mass.

13. The isothermal gas supply according to claim 11, wherein the gas mixture comprises approximately 9% helium and approximately 91% nitrogen as determined by mass.

14. A method for minimizing a temperature excursion of a gas mixture released from a pressurized gas supply including a pressurized gas reservoir and a pressure regulator fluidly coupled between the pressurized gas reservoir and an outlet of the pressurized gas supply, the pressurized gas reservoir configured to releasably hold the gas mixture at a starting pressure ($P_S$) and at a starting temperature ($T_S$), the pressure regulator configured to reduce a pressure of the gas mixture to a predetermined output pressure ($P_O$) at a predetermined mass flow rate ($F_O$), wherein gas released from the pressurized gas reservoir is received by the pressure regulator and output from the pressure regulator as the gas mixture output from the pressurized gas supply at the $P_O$ and at an output temperature $T_O$, wherein the gas mixture output from the pressurized gas supply is held at a substantially constant mass flow rate during operation of the pressurized gas supply, and wherein an outlet of the pressured gas reservoir is configured to fluidly couple to an inlet of the pressure regulator by a first flow passage, and an outlet of the pressure regulator is fluidly coupled to an inlet of a gas-consuming device by a second flow passage, the method comprising:
  establishing the starting temperature ($T_S$) of the gas mixture and the starting pressure ($P_S$) of the gas mixture;
  selecting a warming gas to be included within the gas mixture, the warming gas having a positive Joule-Thomson (JT) coefficient at $T_S$ and over a pressure range $P_S$ to $P_O$;
  choosing a cooling gas to be included within the gas mixture, the cooling gas having a negative JT coefficient at $T_S$ and over the pressure range $P_S$ to $P_O$; and
  filling the pressurized gas reservoir with the gas mixture having the selected warming gas and the chosen cooling gas.

15. The method according to claim 14, further comprising:
  determining a warming gas-to-cooling gas mass ratio at which warming of the warming gas, when expanded through the pressure regulator, substantially offsets cooling of the cooling gas when expanded through the pressure regulator; and
  mixing the warming gas with the cooling gas at approximately the determined warming gas-to-cooling gas mass ratio.

16. The method according to claim 14, wherein the pressurized gas reservoir cools as the pressurized gas mixture is released therefrom, and wherein the method further comprises:
  determining a warming gas-to-cooling gas mass ratio at which warming of the wan ling gas, when expanded through the pressure regulator, substantially offsets combined cooling of the cooling gas when expanded through the pressure regulator and the cooling of the pressurized gas reservoir; and
  mixing the warming gas with the cooling gas at approximately the determined warming gas-to-cooling gas mass ratio.

17. The method according to claim 14, wherein the step of selecting comprises selecting the warming gas from the group consisting of neon, nitrogen, and argon; and wherein the step of choosing comprises choosing the cooling gas selected from the group consisting of helium and hydrogen.

18. The isothermal gas supply according to claim 11, wherein operation of the isothermal gas supply comprises operating with the $P_S$ having a value between a maximum starting pressure ($P_{Smax}$) of the pressurized gas reservoir and $P_O$.

* * * * *

UNITED STATES PATENT AND TRADEMARK OFFICE
CERTIFICATE OF CORRECTION

| | | |
|---|---|---|
| PATENT NO. | : 8,640,468 B2 | Page 1 of 1 |
| APPLICATION NO. | : 12/467747 | |
| DATED | : February 4, 2014 | |
| INVENTOR(S) | : Lukens | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this
Twenty-first Day of July, 2015

Michelle K. Lee
*Director of the United States Patent and Trademark Office*